US012800102B2

(12) United States Patent
Kondogiani et al.

(10) Patent No.: US 12,800,102 B2
(45) Date of Patent: Nov. 17, 2026

(54) THERMAL MANAGEMENT IN CONFORMABLE TANKS

(71) Applicant: Noble Gas Systems, Inc., Wixom, MI (US)

(72) Inventors: Christopher T. Kondogiani, Novi, MI (US); Somesh J. Rath, Indianapolis, IN (US); Mallory Marie Barrett, Milford, MI (US)

(73) Assignee: Noble Gas Systems, Inc., Wixom, MI (US)

( * ) Notice: Subject to any disclaimer, the term of this patent is extended or adjusted under 35 U.S.C. 154(b) by 0 days.

(21) Appl. No.: 19/058,716

(22) Filed: Feb. 20, 2025

(65) Prior Publication Data

US 2026/0194185 A1 Jul. 9, 2026

Related U.S. Application Data

(63) Continuation of application No. 17/760,647, filed as application No. PCT/US2020/050816 on Sep. 15, 2020, now Pat. No. 12,259,090.

(Continued)

(51) Int. Cl.
*F17C 1/02* (2006.01)

(52) U.S. Cl.
CPC ........ *F17C 1/02* (2013.01); *F17C 2201/0138* (2013.01); *F17C 2203/0604* (2013.01);

(Continued)

(58) Field of Classification Search
CPC ................ F17C 1/02; F17C 2205/0111; F17C 2201/0138; F17C 2203/0604;

(Continued)

(56) References Cited

U.S. PATENT DOCUMENTS 10,054,267 B2 * 8/2018 Yersak .................. F17C 13/084
2014/0174955 A1 * 6/2014 Sasagawa ........... C23C 16/4481
206/0.6

(Continued)

FOREIGN PATENT DOCUMENTS

CA 3013122 * 2/2019
DE 102017220715 A1 * 5/2019 ........... F17C 13/084

(Continued)

OTHER PUBLICATIONS

International Search Report & Written Opinion for International Application No. PCT/US2020/050816 mailed Dec. 3, 2020.

(Continued)

*Primary Examiner* — Rafael A Ortiz
(74) *Attorney, Agent, or Firm* — Young Basile Hanlon & MacFarlane, P.C.

(57) ABSTRACT

A conformable pressure vessel includes pressure vessel segments comprising a liner. The liner of each of the pressure vessel segments define a cavity configured to contain pressurized gas. The pressure vessel segments are coupled together such that the cavity of each of the pressure vessel segments are fluidly coupled. The conformable pressure vessel includes an inlet in fluid communication with the cavity of a first of the pressure vessel segments and configured to receive gas from a gas source, and includes an outlet in fluid communication with a last of the pressure vessel segments and configured to output the gas from the pressure vessel segments. The conformable pressure vessel includes a connecting tube in fluid communication with the inlet and the outlet. An interior profile of the connecting tube is shaped to enable flow of the gas through the connecting tube from the outlet to the inlet and to prevent flow of the gas through the connecting tube from the inlet to the outlet.

20 Claims, 10 Drawing Sheets

Related U.S. Application Data

(60) Provisional application No. 62/900,940, filed on Sep. 16, 2019.

(52) U.S. Cl.
CPC *F17C 2203/066* (2013.01); *F17C 2203/0663* (2013.01); *F17C 2205/0111* (2013.01); *F17C 2205/0126* (2013.01); *F17C 2205/0323* (2013.01); *F17C 2223/0123* (2013.01); *F17C 2227/0302* (2013.01); *F17C 2260/023* (2013.01)

(58) Field of Classification Search
CPC ........ F17C 2203/066; F17C 2203/0663; F17C 2205/0126; F17C 2205/0323; F17C 2223/0123; F17C 2227/0302
USPC ........................................................... 220/0.6
See application file for complete search history.

(56) References Cited

U.S. PATENT DOCUMENTS

| | | | | |
|---|---|---|---|---|
| 2014/0305951 | A1* | 10/2014 | Griffith | F17C 1/00 220/581 |
| 2017/0030300 | A1* | 2/2017 | Kondogiani | F02D 19/029 |
| 2017/0157837 | A1* | 6/2017 | Wexler | B29C 63/04 |
| 2017/0283612 | A1 | 10/2017 | Sybert et al. | |
| 2018/0080609 | A1* | 3/2018 | Abd Elhamid | F17C 13/02 |
| 2018/0283610 | A1* | 10/2018 | Wexler | F17C 1/16 |
| 2018/0283612 | A1* | 10/2018 | Wexler | F17C 13/026 |
| 2019/0120432 | A1* | 4/2019 | Wexler | F17C 5/007 |
| 2019/0211972 | A1 | 7/2019 | Abd Elhamid et al. | |

FOREIGN PATENT DOCUMENTS

| | | | |
|---|---|---|---|
| DE | 102018010103 | A1 | 7/2019 |
| EP | 1584859 | A2 | 10/2005 |
| RU | 16671 | U1 | 1/2001 |
| WO | 2016205372 | A2 | 12/2016 |

OTHER PUBLICATIONS

European Search Report for EP Application No. 20865724.7 dated Sep. 5, 2023.

* cited by examiner

THERMAL MANAGEMENT IN CONFORMABLE TANKS

CROSS-REFERENCE TO RELATED APPLICATION(S)

This application is a continuation of U.S. application Ser. No. 17/760,647, filed on Mar. 15, 2022, which is a National Stage Entry of PCT International Application No. PCT/US2020/050816, filed on Sep. 15, 2020, published as WO2021/055319 on Mar. 25, 2021, which claims the benefit of U.S. Provisional Application No. 62/900,940, filed on Sep. 16, 2019, the entire disclosures of which are hereby incorporated by reference in their entireties.

BACKGROUND

Gas storage tanks or pressure vessels are used to store many different gaseous substances. When filling storage tanks or pressure vessels at a high rate, the overall temperature inside of the given pressure vessel increases. For example, in order to fill a five kg pressure vessel within three minutes, the gas must enter the pressure vessel at a rate of approximately 30 grams per second. As the gas compresses, the gas increases in temperature due to heat generated during compression. Conformable pressure vessels consist of multiple pressure vessel segments stacked together inside a shell. The use of pressure vessel segments can reduce the mixing of the gas within the conformable pressure vessel. Since one inlet is generally used during filling of the conformable pressure vessel, different pressure vessel segments have different temperatures based on progression of heat flow through the pressure vessel segments, causing a temperature gradient throughout the conformable pressure vessel.

A decrease in temperature of a first pressure vessel segment downstream from a fill port is explained by adiabatic expansion of the gas. Some gases also experience the Joule-Thomson effect, which describes the isenthalpic expansion of gases. As gas expands from a high-pressure reservoir to the lower-pressure conformable pressure vessel, the gas cools. This cooling occurs without heat being transferred to the surrounding conformable pressure vessel; rather, the cooling is due to expansion caused by the decrease in pressure. A last pressure vessel segment upstream from an outlet of the conformable pressure vessel experiences an increase in temperature because, unlike the first pressure vessel segment which encounters adiabatic cooling, the gas in the last pressure vessel segment only experiences an increase in pressure. Therefore, as the gas in the last pressure vessel segment is compressed, the temperature of the gas rises due to heat of compression.

SUMMARY

This disclosure relates to conformable pressure vessel including pressure vessel segments defined by a cavity disposed within a liner. The pressure vessel segments receive and store a gas in a compressed state, and each of the pressure vessel segments includes a first section of the liner having a first diameter and a second section of the liner having a second diameter smaller than the first diameter. The conformable pressure vessel includes a reinforcement layer surrounding the liner and an inlet in fluid communication with the cavity of the liner. The inlet receives the gas from a gas source. The conformable pressure vessel further includes an outlet in fluid communication with the cavity of the liner, and the outlet outputs the gas from the pressure vessel segments. The conformable pressure vessel includes a connecting tube in fluid communication with the inlet and the outlet, and the connecting tube receives the gas from the outlet and to supply the gas from the outlet to the inlet so that the gas is recirculated through the pressure vessel segments in response to the inlet receiving the gas from the gas source.

The inlet may include a nozzle having a first end downstream of the gas source, a second end downstream of the first end and upstream of the pressure vessel segments, and a middle portion between the first end and the second end. The middle portion may have a cross-sectional area smaller than a cross-sectional area of the first end and a cross-sectional area of the second end. When the gas flows across the middle portion, the middle portion may increase velocity of gas flow as the gas source pushes the gas to the inlet. The connecting tube may include an entry end connected with the outlet and an exit end connected with the second end of the nozzle. When the gas flows from the nozzle to the inlet, from the inlet through the pressure vessel segments, and to the outlet out the connecting tube, a temperature of the conformable pressure vessel may be equalized. An interior profile of the connecting tube may be shaped to enable flow of the gas through the connecting tube from the outlet to the inlet and to prevent the flow of the gas through the connecting tube from the inlet to the outlet. The connecting tube may include a tesla valve so that temperature of the conformable pressure vessel is equalized as the gas flows across the pressure vessel segments, the connecting tube, or both.

The conformable pressure vessel may further include a shell enclosing the pressure vessel segments, and the inlet and the outlet may be integrated in walls of the shell so that the gas is movable between the pressure vessel segments and the outlet or the inlet. The conformable pressure vessel may further include heat pipes extending perpendicularly along the pressure vessel segments, and the heat pipes may allow heat to flow between the pressure vessel segments. The pressure vessel segments may be stacked within the shell in a row so that the heat pipes are laying across the pressure vessel segments. The conformable pressure vessel may further include thermally conductive materials surrounding the reinforcement layer at a top-most pressure vessel segment and a bottom-most pressure vessel segment, and the thermally conductive materials may assist creating an equilibrium of temperature between the pressure vessel segments. The inlet and the outlet each may include a stem creating a fluid connection between the pressure vessel segments and the connecting tube; and a cap securing the liner, the reinforcement layer, and the stem so that fluids are movable between the cavity and the inlet or the outlet.

The disclosure further relates to a conformable pressure vessel including a liner defining a cavity and pressure vessel segments formed along the liner in first sections having a first diameter and second sections having a second diameter smaller than the first diameter. The conformable pressure vessel includes an inlet in fluid communication with the cavity of the liner through the second section of a first pressure vessel segment, and the inlet receives a gas from a gas source. The conformable pressure vessel includes an outlet in fluid communication with the cavity of the liner through the second section of a second pressure vessel segment, and the outlet outputs the gas from the liner. The conformable pressure vessel includes a connecting tube facilitating fluid communication between the inlet and the outlet so that the gas flows from the outlet to the inlet and is recirculated through the liner in a way that distributes heat throughout the pressure vessel segments, and the connecting tube receives the gas from the gas source. The conformable pressure vessel includes a reinforcement layer surrounding the liner and a phase change material coating an interior surface of the liner.

The phase change material may coat every one of the pressure vessel segments so that the heat is distributed throughout the conformable pressure vessel. The phase change material may absorb energy and at least partially melt so that temperature of the conformable pressure vessel is equalized. The conformable pressure vessel may further include a nozzle having a first end connected with a middle portion and connect with the gas source and a second end connected with the middle portion and the connecting tube, and the middle portion may have a cross-sectional area smaller than a cross-sectional area of the first end and a cross-sectional area of the second end. The connecting tube may be connected with the outlet or the inlet, and when the connecting tube is connected with the outlet, the second end of the nozzle may space the connecting tube from the inlet. When the connecting tube is connected with the inlet, the second end of the nozzle may space the connecting tube from the outlet.

The disclosure further relates to a conformable pressure vessel including pressure vessel segments, and each pressure vessel segment defines a cavity that is adjacent to a narrow portion. The pressure vessel segments couple together at the respective narrow portions so that the respective cavities are fluidly coupled and the pressure vessel segments form a continuous structure. The conformable pressure vessel includes an inlet in fluid communication with the cavities of the pressure vessel segments through the narrow portion of an entry pressure vessel segment, and the inlet receives a gas from a gas source. The conformable pressure vessel includes an outlet in fluid communication with the cavities of the pressure vessel segments through the narrow portion of an exit pressure vessel segment, and the outlet outputs the gas from the pressure vessel segments. The conformable pressure vessel includes heat pipes extending perpendicularly between stacked pressure vessel segments, and the heat pipes allow heat to flow between the pressure vessel segments.

The conformable pressure vessel may further include a reinforcement layer positioned between the heat pipes and the pressure vessel segments, and the reinforcement layer may surround each of the pressure vessel segments. The conformable pressure vessel may further include a thermally conductive material surrounding the reinforcement layer and/or coupling two or more pressure vessel segments so that the heat pipes and the thermally conductive material distribute heat throughout the conformable pressure vessel. The conformable pressure vessel may further include a shell enclosing the thermally conductive material, the heat pipes, and the pressure vessel segments so that the thermally conductive material, the heat pipes, and the pressure vessel segments are protected from an outside environment. The heat pipes may extend from the entry pressure vessel segment to the exit pressure vessel segment so that each heat pipe contacts at least two pressure vessel segments.

The disclosure further relates to a conformable pressure vessel that includes pressure vessel segments comprising a liner. The liner of each of the pressure vessel segments defines a cavity configured to contain pressurized gas. The pressure vessel segments are coupled together such that the cavity of each of the pressure vessel segments are fluidly coupled. The conformable pressure vessel includes an inlet in fluid communication with the cavity of a first of the pressure vessel segments and configured to receive gas from a gas source, and includes an outlet in fluid communication with a last of the pressure vessel segments and configured to output the gas from the pressure vessel segments. The conformable pressure vessel includes a connecting tube in fluid communication with the inlet and the outlet. An interior profile of the connecting tube is shaped to enable flow of the gas through the connecting tube from the outlet to the inlet and to prevent flow of the gas through the connecting tube from the inlet to the outlet.

The disclosure further relates to a conformable pressure vessel that is configured to contain pressurized gas. The conformable pressure vessel includes a first pressure vessel segment comprising a first liner that defines a first cavity and a second pressure vessel segment comprising a second liner that defines a second cavity. Each of the first pressure vessel segment and the second pressure vessel segment includes a first section and a second section, in which a diameter of the second section is smaller than a diameter of the first section. The first cavity is fluidly coupled to the second cavity through the second section of the first pressure vessel segment and the second section of the second pressure vessel segment. The conformable pressure vessel also includes an inlet upstream of the second section of the first pressure vessel segment and an outlet downstream of the second section of the second pressure vessel segment. The inlet is configured to receive a gas from a source to supply the gas to the first cavity and the second cavity, and the outlet is configured to output the gas from the first cavity and the second cavity. The inlet is in fluid communication with the outlet through a connecting tube that is shaped to enable unidirectional flow of the gas from the outlet to the inlet.

The disclosure further relates to a conformable pressure vessel that includes pressure vessel segments each including a liner. The liner of each of the pressure vessel segments coupled together to define a cavity, in which the cavity is configured to contain pressurized gas therein. The conformable pressure vessel also includes an inlet that is in fluid communication with the cavity and is configured to receive gas from a source. The conformable pressure vessel also includes an outlet that is in fluid communication with the cavity and is configured to output the gas from the cavity. The conformable pressure vessel also includes a thermally conductive material surrounding at least one of the pressure vessel segments and includes a shell enclosing the pressure vessel segments and the thermally conductive material, in which at least one of the inlet or the outlet extends through the shell.

DETAILED DESCRIPTION

Figure 1:
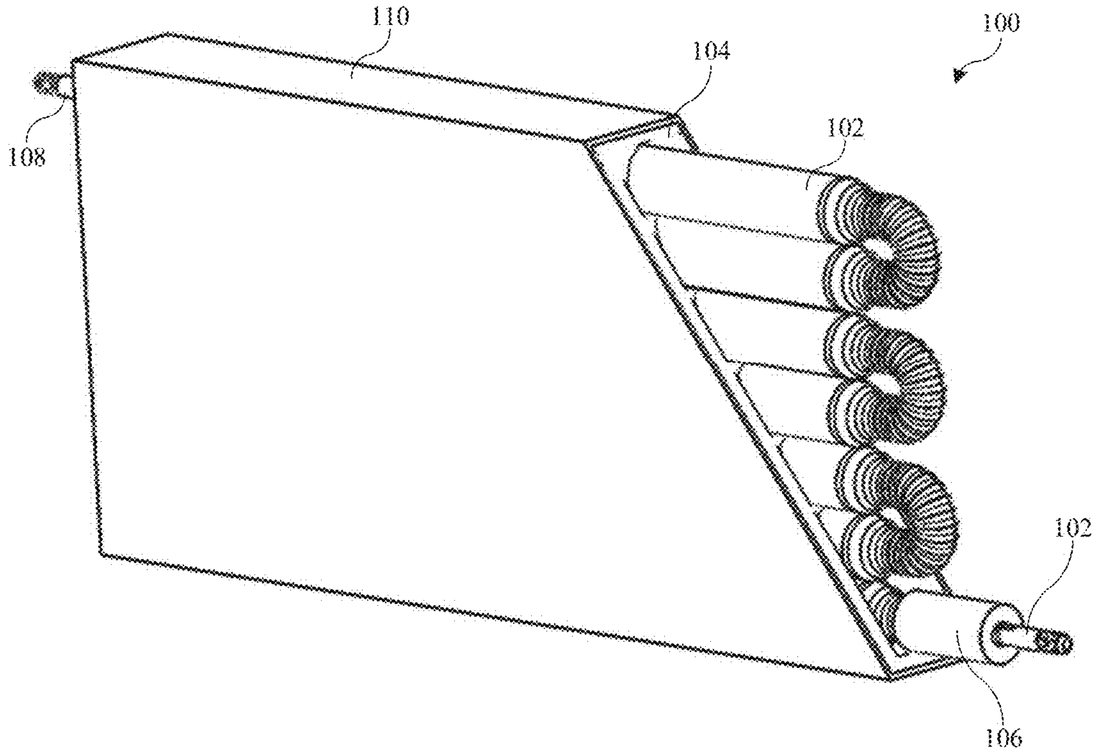
FIG. 1 is a cut-away perspective view of a conformable pressure vessel showing pressure vessel segments, end fittings, thermally conductive foam, and a shell.

The thermal management methods disclosed herein are configured to manage the thermal gradient that arises due to pressurizing a conformable pressure vessel including pressure vessel segments.

Heat gradients typically do not develop within the interior of traditional gas storage tanks because the gas is mixed throughout the entire storage tank instead of split between pressure vessel segments. The gas has the freedom to move and mix, so any rise in temperature is diffused evenly throughout the storage tank. Unlike conformable pressure vessels, traditional storage tanks are not sectioned, so there is no beginning or end.

In one example, a conformable pressure vessel includes seven pressure vessel segments. A last pressure vessel segment is capped with a plug and a first pressure vessel segment is connected to a valve to fill the conformable pressure vessel. Gas continuously enters the first pressure vessel segment and then gets pushed into the following pressure vessel segments as more gas enters. There is a pressure drop occurring in each consecutive pressure vessel segment because gas must flow through a section of each pressure vessel segment having a lesser diameter to reach the next pressure vessel segment. Therefore, the gas in the last pressure vessel segment is at a lower pressure than the gas in the first pressure vessel segment. Pressure tends to equalize throughout a traditional storage tank, but due to the pressure vessel segments included in the conformable pressure vessel, this equilibrium takes longer to achieve. Therefore, the pressure of the gas in the last pressure vessel segment will always lag behind the pressure of the gas in the first pressure vessel segment.

A magnification of this phenomenon occurs when the fill rate of the conformable pressure vessel is increased. Adding gas at a faster rate causes the temperature difference between pressure vessel segments to be much greater and leads to heat building up within the conformable pressure vessel more quickly. This increase in heat within the conformable pressure vessel occurs because more gas molecules are compressed in a smaller amount of time.

To manage the thermal gradient present during fill or extraction of gas from conformable pressure vessels, several methods are disclosed. The first method involves using thermal conductive materials in the conformable pressure vessel. Thermal conductive materials leverage the increased surface to volume ratio of the pressure vessel to transfer heat between the different parts of the pressure vessel to achieve a thermal equilibrium and avoid extreme temperatures within the conformable pressure vessel. Another method recirculates the gases in the conformable pressure vessel. Another method uses phase change materials within the conformable pressure vessel.

Thermally conductive material transfers heat from the pressure vessel segments having a higher temperature to the pressure vessel segments having a lower temperature due to heat transfer caused by conduction and convection. Each pressure vessel segment is defined by a liner material (e.g. a thermoplastic liner). A reinforcement layer surrounds the liner. The reinforcement layer can be surrounded by a thermally conductive material, such as a thermally conductive foam. A shell encloses the thermally conductive foam. Thermally conductive material, such as a heat pipe, can couple two or more pressure vessel segments. Thermal conduction allows for more thermal consistency throughout the conformable pressure vessel, where heat transfer can reduce the temperature extremes and achieve faster thermal equilibrium.

The method of recirculating the gas is accomplished by connecting different pressure vessel segments to allow the gas to travel in a continuous loop through the conformable pressure vessel. To enable this continuous gas flow, the pressure vessel may include a connecting tube connecting an outlet of the conformable pressure vessel to an inlet. The connecting tube may include a Tesla valve, which is a valve allowing unidirectional flow. Continuous gas flow through the pressure vessel segments enables temperature diffusion throughout the conformable pressure vessel as hot gas flows from the last pressure vessel segment into the cooler first pressure vessel segment. Simulations using this method show that, compared to conformable pressure vessels lacking continuous flow, the temperature of the first pressure vessel segment increases, and the temperature of the last pressure vessel segment decreases to reach a state of thermal equilibrium between the pressure vessel segments.

Another method includes using a phase change material (PCM) applied to the liner of the conformable pressure vessel. PCMs have been widely studied as thermal energy storage options in gas storage tanks. PCMs absorb heat generated during fueling of gas storage tanks in the form of latent heat. As the PCM absorbs heat, it begins to melt, but it does not heat up. In one example, the PCM includes paraffin wax embedded with a graphite matrix. The PCM works most efficiently when the mixture is applied to the inside of the liner. This configuration allows a faster fill rate of the conformable pressure vessel. The PCM also reduces the degree of pre-cooling required for a given fill time by 10-20 °C.

FIG. 1 shows a cutaway perspective view of a conformable pressure vessel 100. The conformable pressure vessel 100 contains seven connected pressure vessel segments 102 configured to receive and store a gas in a compressed state. Each of the pressure vessel segments 102 includes a liner (e.g. a thermoplastic liner) underneath a reinforcement layer (e.g. a fiber layer). The pressure vessel segments 102 are surrounded by a thermally conductive material, in this example, a thermally conductive foam 104. The pressure vessel segments 102 and the thermally conductive foam 104 are enclosed by a shell 110. FIG. 1 also shows an end fitting including a cap 106 and a stem 108. The end fittings connect the conformable pressure vessel 100 to valves, adapters, plugs, or couplings, and assist in containing the pressurized gas within the conformable pressure vessel 100. There is an end fitting on each end of the pressure vessel segments 102 that reaches outside the shell 110.

Figure 2:
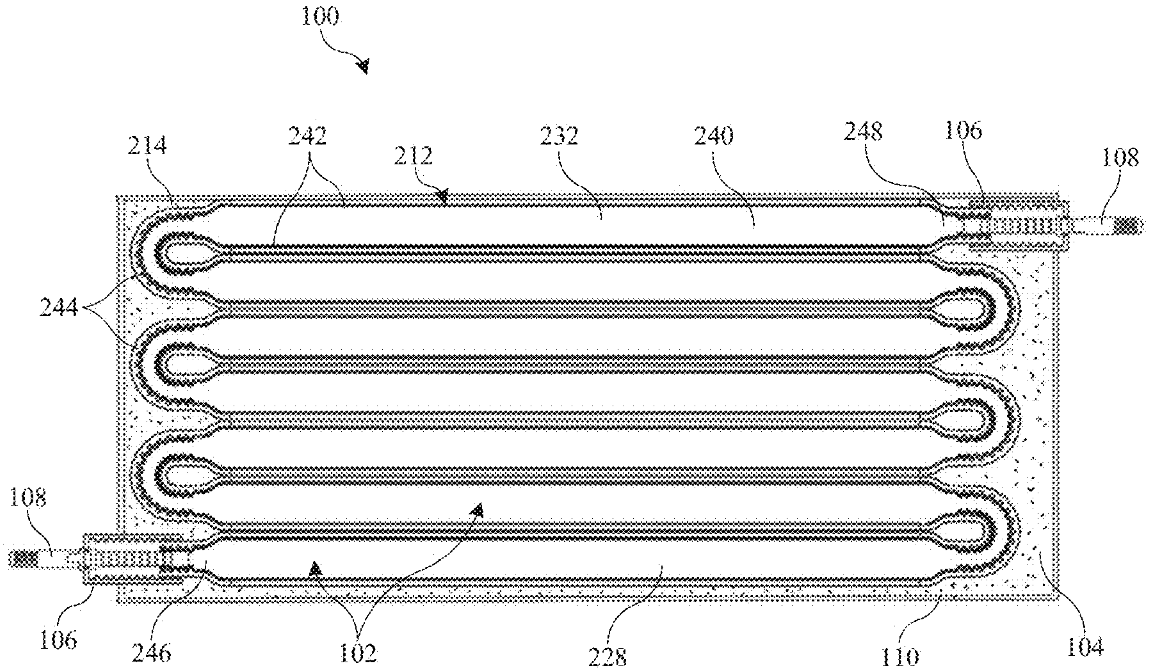
FIG. 2 is a sectional view of a seven-segment conformable pressure vessel.

FIG. 2 shows a sectional view of the same seven-segment conformable pressure vessel 100. Each pressure vessel segment 102 includes a liner 212 that defines a cavity 240. The liner 212 can include a thermoplastic liner. Each liner 212 includes a first section 242 having a first diameter and a second section 244 having a second diameter smaller than the first diameter. The pressure vessel segments 102 are coupled together at the respective second sections 244 of the liner 212 such that the cavities 240 of each liner 212 are fluidly coupled. The conformable pressure vessel 100 includes an inlet 246 in fluid communication with the cavities 240 of the pressure vessel segments 102 through the second section 244 of a first pressure vessel segment 228. The inlet 246 is configured to receive a gas from a gas source. The conformable pressure vessel 100 also includes an outlet 248 in fluid communication with the cavities 240 of the pressure vessel segments 102 through the second section 244 of a second pressure vessel segment 232. The outlet 248 is configured to output the gas from the pressure vessel segments 102. Though the outlet 248 is shown as being in fluid communication with the last pressure vessel segment in the seven-segment conformable pressure vessel 100 (i.e., the second pressure vessel segment 232) in this example, either the inlet 246 or the outlet 248 could be fluidly coupled with alternate pressure vessels segments.

A reinforcement layer 214 surrounds the liner 212. The reinforcement layer 214 can include a fiber reinforcement layer. The thermally conductive foam 104 surrounds the reinforcement layer 214. The shell 110 encloses the thermally conductive foam 104 and the pressure vessel segments 102. One cap 106 connects to the liner 212 and the reinforcement layer 214 at the inlet 246. Another cap 106 connects to the liner 212 and the reinforcement layer 214 at the outlet 248. The caps 106 function to attach the stems 108 to the respective pressure vessel segments 102. The thermally conductive foam 104 and the shell 110, which provide structure, support, and protection for the pressure vessel segments 102, are also shown.

Materials such as plastic and high strength fibers typically used in lightweight and high-pressure gas storage tanks and conformable pressure vessels do not have high thermal conductivities. However, by using thermally conductive materials such as thermally conductive foams and heat pipes as indicated herein, the high surface to volume ratio in conformable pressure vessels can be used to transfer heat from areas of high temperature to areas of low temperature. This can significantly reduce temperature extremes within the conformable pressure vessel. An example is described in reference to FIG. 3.

Figure 3:
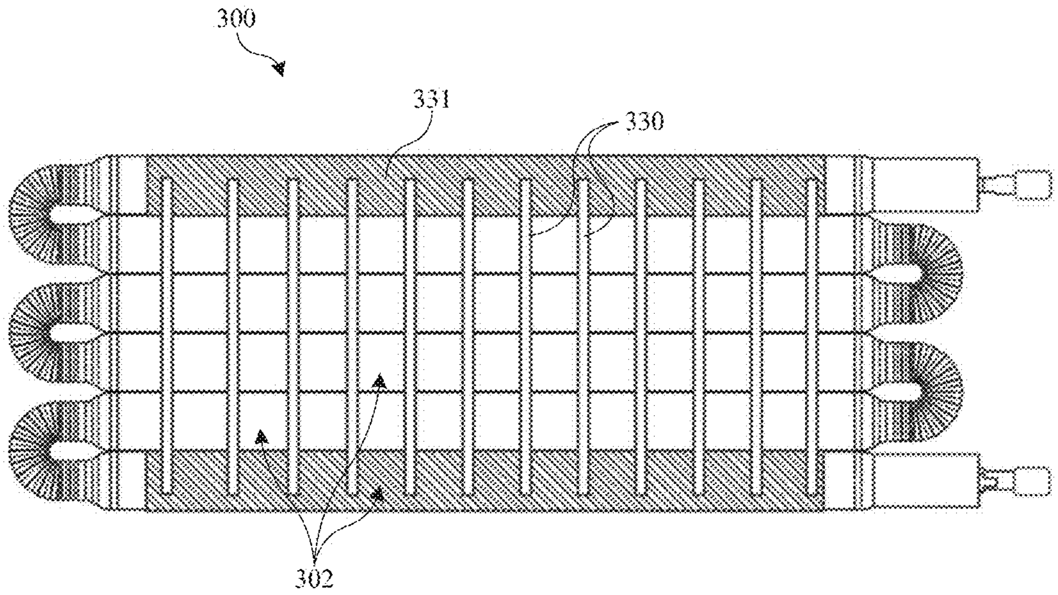
FIG. 3 is a side view of a six-segment conformable pressure vessel including a thermally conductive material disposed around pressure vessel segments and heat pipes that extend between pressure vessel segments to conduct heat between hot and cold segments.

FIG. 3 is a side view of a six-segment pressure vessel 300. The pressure vessel 300 includes the pressure vessel segments 302. The pressure vessel segments 302 are connected by heat pipes 330, also referred to as thermally conductive members. The heat pipes 330 allow heat to flow between the pressure vessel segments 302. In this configuration, when different pressure vessel segments 302 are heated or cooled to different temperatures, the heat pipes 330 can assist in creating temperature equilibrium between the different pressure vessel segments 302. The heat pipes 330 are connected to thermally conductive materials 331 which are disposed around the top-most and bottom-most pressure vessel segments 302 in the example of FIG. 3. The thermally conductive materials 331 can further assist in creating the temperature equilibrium between the pressure vessel segments 302. Though the heat pipes 330 are shown as extending between first and last pressure vessel segments 302, the heat pipes 330 can be applied between any respective pressure vessel segments 302 in the same pressure vessel 300 to achieve temperature equilibrium. Additionally, though the thermally conductive materials 331 are shown as surrounding the first and last pressure vessel segments 302, the thermally conductive materials 331 can surround any of the pressure vessel segments 302 in the pressure vessel 300.

Figure 4:
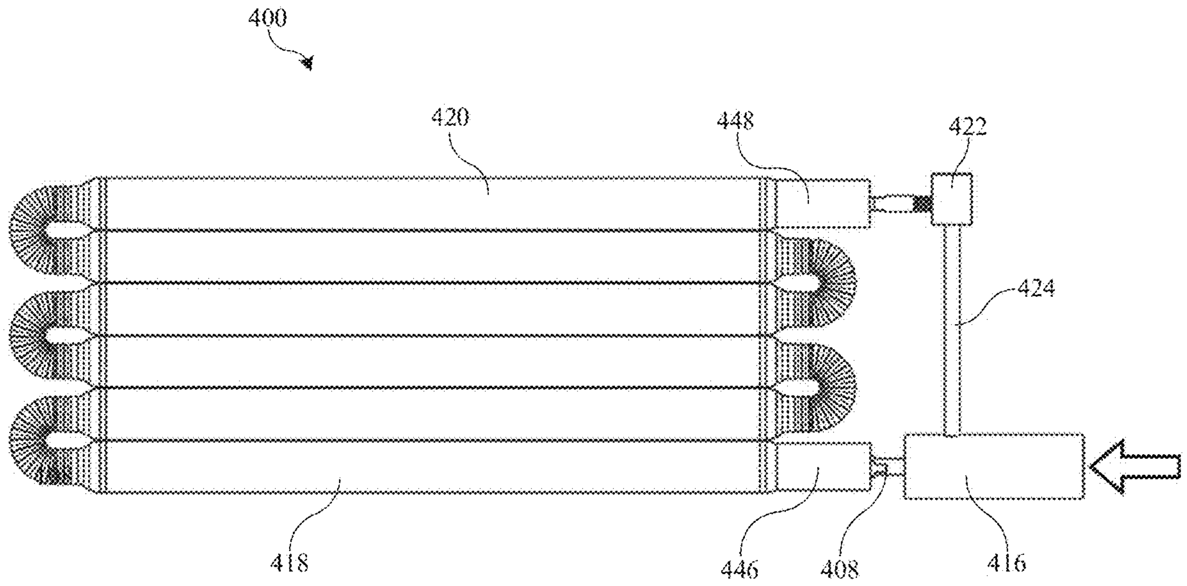
FIG. 4 is a side view of a six-segment conformable pressure vessel showing a connecting tube connecting a last pressure vessel segment and a first pressure vessel segment.

FIG. 4 shows a side view of a conformable pressure vessel 400 with six pressure vessel segments employing one thermal-mitigation method, recirculation. While gas is circulating through the conformable pressure vessel 400, a pressure drop can occur in sections of the pressure vessel segments having a lesser diameter because these sections can restrict flow between the pressure vessel segments. During a fill event, the last pressure vessel segment, that is, the pressure vessel segment furthest downstream from the location of an inlet, is therefore at a lower pressure than the first pressure vessel segment. Pressure tends to equalize throughout gas storage tanks, but due to the segmented nature of the conformable pressure vessel 400, this equilibrium can take some time to achieve.

The method of recirculation can be used to more quickly achieve a pressure and/or temperature equilibrium in the conformable pressure vessel 400. This method involves connecting the first pressure vessel segment and the last pressure vessel segment. This connection can include a heat pipe connected to the first pressure vessel segment and the last pressure vessel segment to permit the transfer of heat between the pressure vessel segments. This connection can also include a passage for gas to flow between the first and the last pressure vessel segments. In embodiments of the conformable pressure vessel 400 including the passage, gas is able to flow from the last pressure vessel segment into the first pressure vessel segment. This makes the conformable pressure vessel 400 act as if it were one continuous segment. The increase in temperature of the conformable pressure vessel 400 is diffused throughout the entire pressure vessel as hot gas flows from the warmer last pressure vessel segment into the cooler first pressure vessel segment.

In FIG. 4, an arrow shows gas entering the conformable pressure vessel 400 in the bottom right corner. The gas leaves the valve of its reservoir and travels through a connector 416, through the stem 408 of the end fitting and into the first pressure vessel segment 418 of the conformable pressure vessel 400. Gas then circulates through each pressure vessel segment and out of the last pressure vessel segment 420 until it reaches the elbow 422. The elbow 422 attaches to a connecting tube 424. The connecting tube 424 is in fluid communication with an inlet 446 of the first pressure vessel segment 418 and with an outlet 448 of the last pressure vessel segment 420. The connecting tube 424 is configured to receive gas from the outlet 448 and to supply the gas from the outlet 448 to the inlet 446. In this configuration, the gas is recirculated through the pressure vessel segments in response to the inlet 446 receiving gas from a gas source (e.g., gas traveling from a reservoir and through the connector 416).

For gas to flow in the direction desired, the last pressure vessel segment 420 must be at a higher pressure than the first pressure vessel segment 418. To achieve this pressure differential, the conformable pressure vessel 400 may include a pressure delta to help motivate flow from the last pressure vessel segment 420 to the first pressure vessel segment 418. In one example, the pressure delta includes a nozzle.

Figure 5:
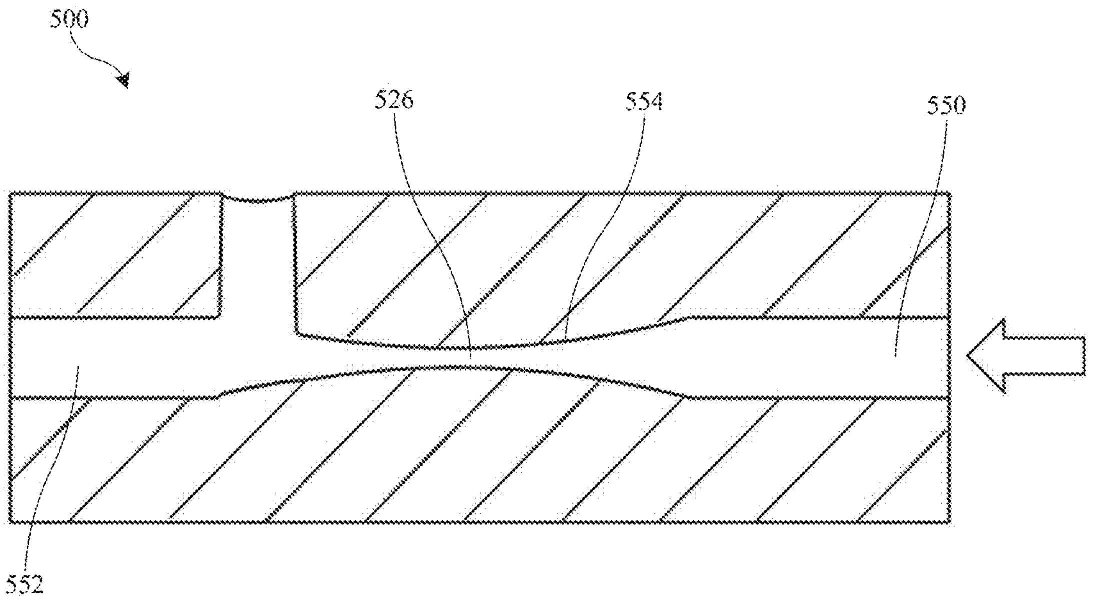
FIG. 5 is a sectional view of an inlet of a conformable pressure vessel including a nozzle.

FIG. 5 shows a sectional view of a nozzle 500 used to create a pressure differential in the conformable pressure vessel 400 of FIG. 4. The nozzle 500 includes a first end 550 downstream from a gas source and a second end 552 downstream from the first end 550 and upstream from the pressure vessel segments. The nozzle 500 includes a middle portion 554 between the first end 550 and the second end 552. A cross-sectional area of the middle portion 554 is smaller than cross-sectional areas of the first end 550 and the second end 552. The nozzle 500 can replace the connector 416 shown in FIG. 4. Gas enters from the right side of the nozzle 500, as shown by the arrow. As the gas moves further through the nozzle 500, the cross-sectional area through which the gas travels decreases. By the principle of mass conservation, the mass flow rate must remain constant throughout the entire nozzle 500. Since mass flow rate is equal to density times velocity times cross-sectional flow area, velocity and cross-sectional area are inversely proportionate.

$$\dot{m} = \rho A v$$

Where, $\dot{m}$ is the mass flow rate, ρ is the density of the fluid and v is the velocity of the fluid. This means that as the cross-sectional area decreases in the middle of the nozzle, the velocity increases to conserve mass flow.

Then, by the Venturi Effect, when the velocity of a fluid or gas increases in a nozzle, pressure decreases. That means that at point 526, the middle of the nozzle 500 in FIG. 5, where the cross-sectional area is the smallest, velocity is largest, and pressure is lowest according to Bernoulli's Principle. Assuming the fluid experiences a negligible change in height while travelling through the nozzle, Bernoulli's equation can be re-written to say that pressure plus (one half times density times velocity squared) remains constant throughout the nozzle 500. This means that if velocity increases, pressure must decrease so that the equation still equals the same constant. Therefore, a low-pressure area can be created in the middle of the nozzle 500. As the gas moves past the middle portion 554 of the nozzle 500, the gas expands and the pressure remains low. This location was selected as the connection point between the first pressure vessel segment 418 and the last pressure vessel segment 420 in the conformable pressure vessel 400 of FIG. 4 to maintain the validity of the narrow cross-section in the middle of the nozzle 500.

Figure 6:
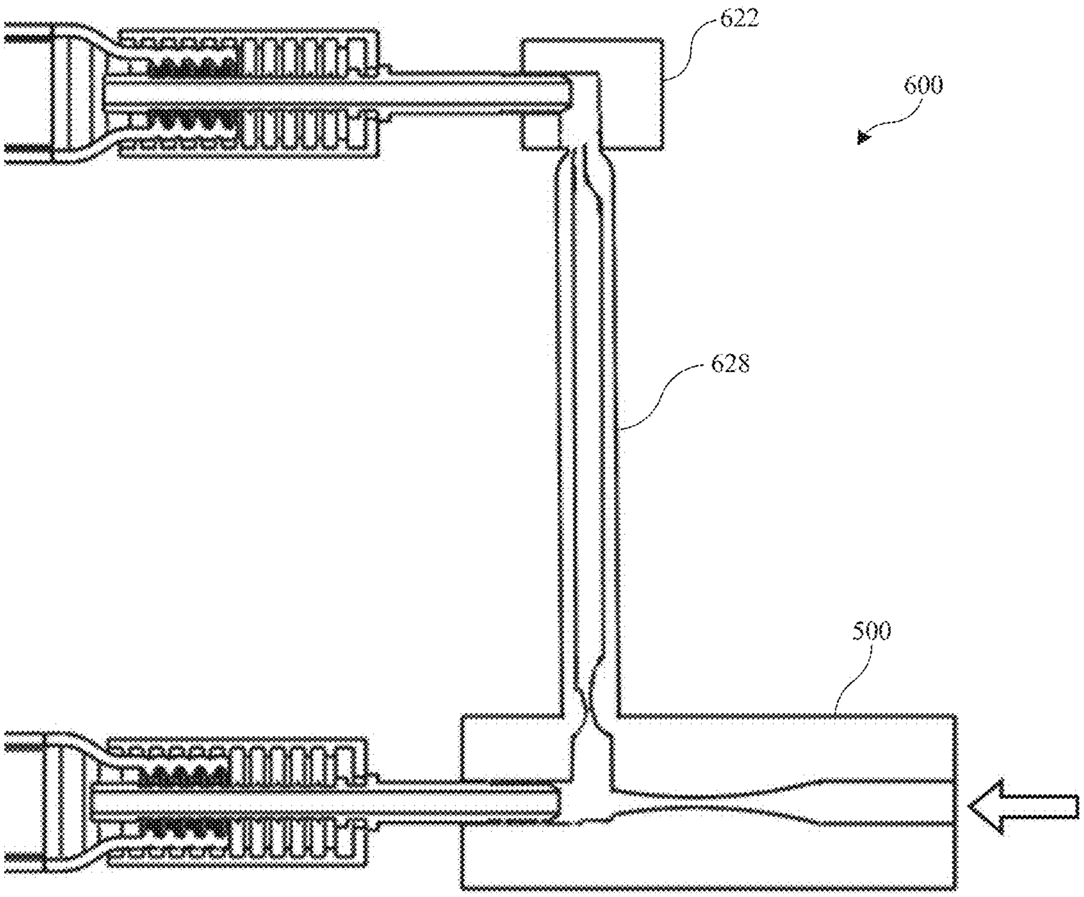
FIG. 6 is a sectional view of part of a conformable pressure vessel including a connecting tube and a nozzle.

FIG. 6 shows a partial sectional view of a pressure vessel 600 similar to the conformable pressure vessel 400 shown in FIG. 4. The gas comes out of a valve and enters the assembly at the bottom right as shown by the arrow. The gas goes straight through the nozzle 500 toward the first pressure vessel segment. While the gas travels through the nozzle 500, the gas reaches its lowest pressure in the middle of the nozzle 500, where the cross-section is smallest. The gas then travels through each consecutive pressure vessel segment, though only the first and last pressure vessel segments are shown in FIG. 6. Once the gas reaches the end of the last pressure vessel segment and enters the elbow 622, the low-pressure area inside the nozzle 500 causes the gas to flow down through the connecting tube 628 toward the nozzle 500. The nozzle 500 connects back to the first pressure vessel segment, so the gas is recirculated throughout the entire pressure vessel 600. During the recirculation, the gas diffuses the heat, allowing the pressure vessel 600 as a whole to reach one equilibrium temperature.

Figure 7:
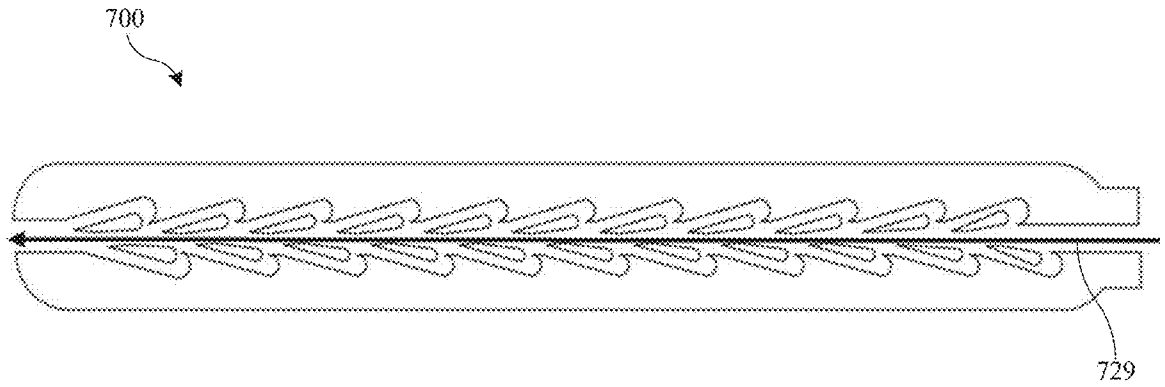
FIG. 7 is a sectional view of a Tesla valve.

Additionally and/or alternatively, one or more other devices may be used to enable recirculation of gas through the pressure vessel in a preferred flow direction. For example, an interior profile of the connecting tube 424 shown in FIG. 4 can be shaped to enable flow of gas through the connecting tube 424 from the outlet 448 to the inlet 446 and to prevent flow of the gas through the connecting tube 424 from the inlet 446 to the outlet 448. This interior profile may be achieved using a Tesla valve, shown in FIG. 7. The Tesla valve causes gas to flow preferentially one way, shown by the arrow 729. For example, in the sectional view shown in FIG. 7, if gas enters the valve from the left side, when it reaches the first intersection, some of the gas splits to follow the top channel and some goes down through the lower channel. The gas that travelled up then follows the path around and ends up looping so far as to be re-directed leftward. This tendency of a fluid or gas to follow the shape of a convex object it contacts is known as the Coanda Effect. This effect causes the gas to interfere with the rest of the flow that was initially travelling from left to right. This occurs at every junction, so the overall flow from left to right is slowed. However, if gas enters the valve from the right side, it experiences a different path. In this case, there are no junctions, due to the angle of the shapes and channels within the cavity of the Tesla valve, so the gas does not split and interfere with its own flow.

Figure 8:
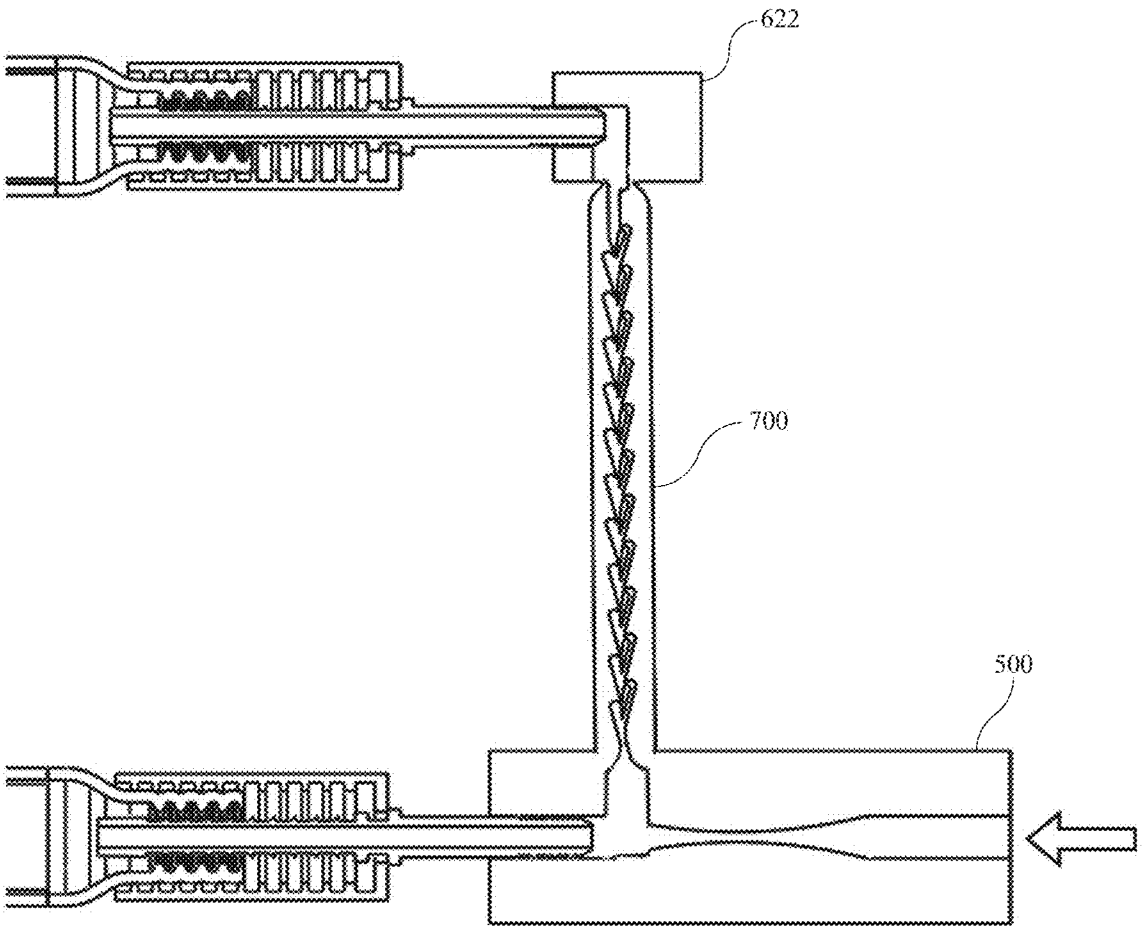
FIG. 8 is a sectional view of part of a conformable pressure vessel including a Tesla valve and a nozzle.

The Tesla valve 700 is shown incorporated into the pressure vessel in FIG. 8. It is oriented so that gas flows preferentially from the last pressure vessel segment to the first pressure vessel segment. This configuration causes the gas to recirculate throughout the conformable pressure vessel and therefore diffuse the thermal gradient that would otherwise form. This may be used independently of or in conjunction with another device used to create a pressure delta, such as the nozzle 500 shown in FIG. 8.

Phase change materials (PCMs) may also be implemented in a conformable pressure vessel to further mitigate the development of temperature gradients. PCMs can store and release large amounts of latent heat energy. As the PCM changes phase, its temperature remains constant even as it absorbs heat. This is because the heat absorbed by the PCM energizes molecules of the PCM to a point where the PCM changes phase. PCMs, such as paraffin wax, can be used to coat an interior of the liner of the conformable pressure vessel. Then, as the coated pressure vessel segment is filled with gas and the temperature rises, the PCM will absorb the heat, preventing the temperature from rising. As the PCM absorbs heat, it begins to melt, but does not heat up. When the area surrounding the PCM becomes cool, the PCM releases the heat, moderating the temperature of the conformable pressure vessel. A PCM may coat an interior surface of the liner of one or more pressure vessel segments. For example, the PCM may coat an interior surface of the liner of every pressure vessel segment individually or may coat the liner of only a first pressure vessel segment and a second (e.g. last) pressure vessel segment. Coating an interior surface of the liner of the first and last pressure vessel segments may assist to moderate the temperature of the conformable pressure vessel since the temperature is most extreme in these segments.

To verify that the methods discussed above are effective, a study was done using physics modeling and pressure and temperature simulations. A first analysis was done to establish a baseline pressure vs. temperature curve for a pressure vessel having seven pressure vessel segments. The first and last pressure vessel segments were not connected, and no additional temperature mitigation device was included aside from the thermal conductivity of the pressure vessel itself, which includes thermally conductive foam. A fill rate of 30 grams per second was used. The results of this analysis are shown in FIGS. 9 and 10.

Figure 9:
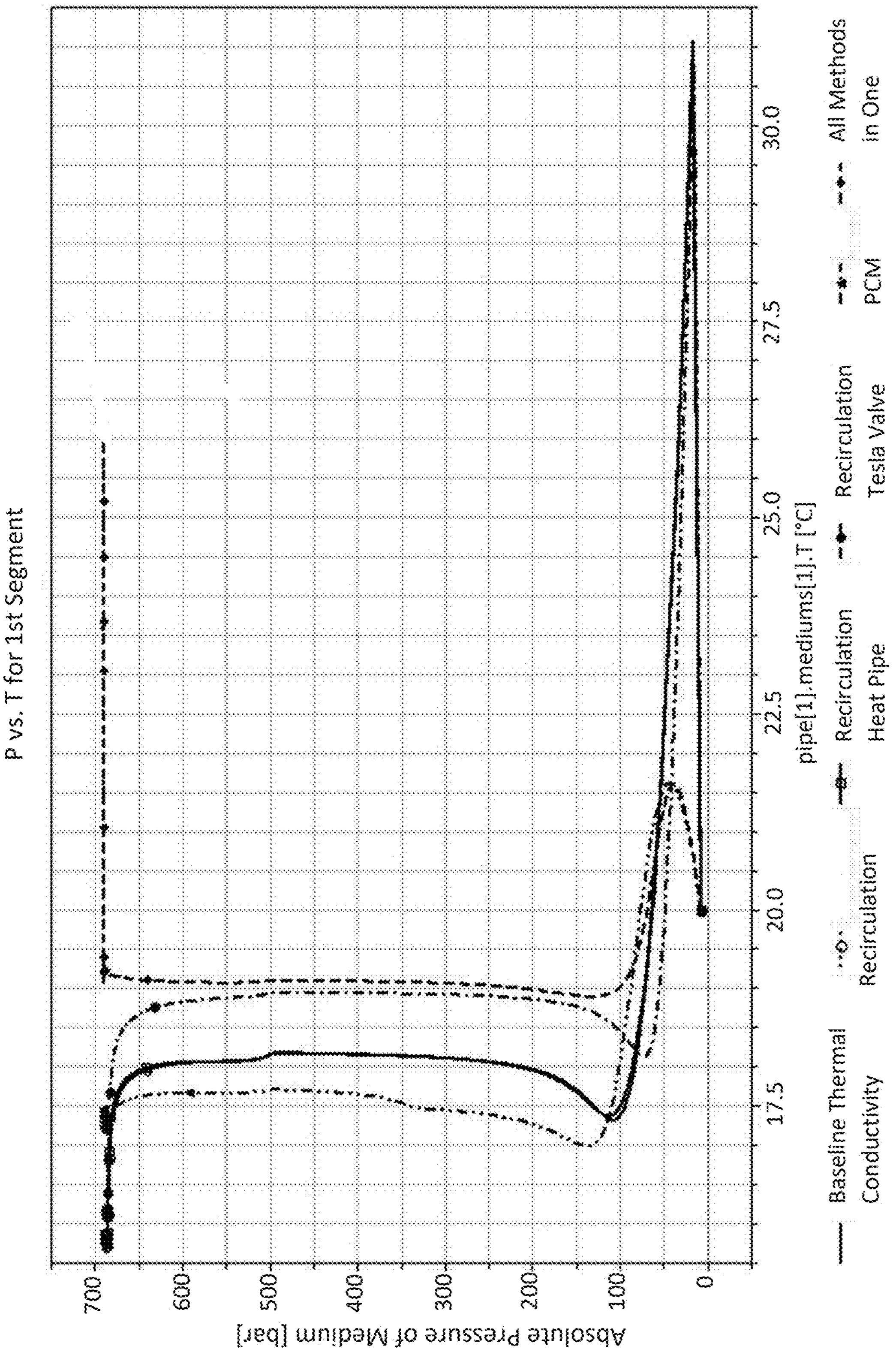
FIG. 9 is a graph of pressure vs. temperature curves for the first pressure vessel segment of different conformable pressure vessels including various temperature mitigation devices.

FIG. 9 includes a graph of pressure vs. temperature curves for the first pressure vessel segment of different conformable pressure vessels including various temperature mitigation devices for the first 30 seconds of gas fill. Separate curves are shown to indicate performance of pressure vessels having the following features: a baseline pressure vessel including thermally conductive foam; a gas recirculating pressure vessel similar to that shown in FIG. 4; a heat pipe;

a gas recirculating pressure vessel including a Tesla valve similar to that shown in FIG. 8; a pressure vessel including a phase change material (PCM); and a pressure vessel including all of these listed features.

Figure 10:
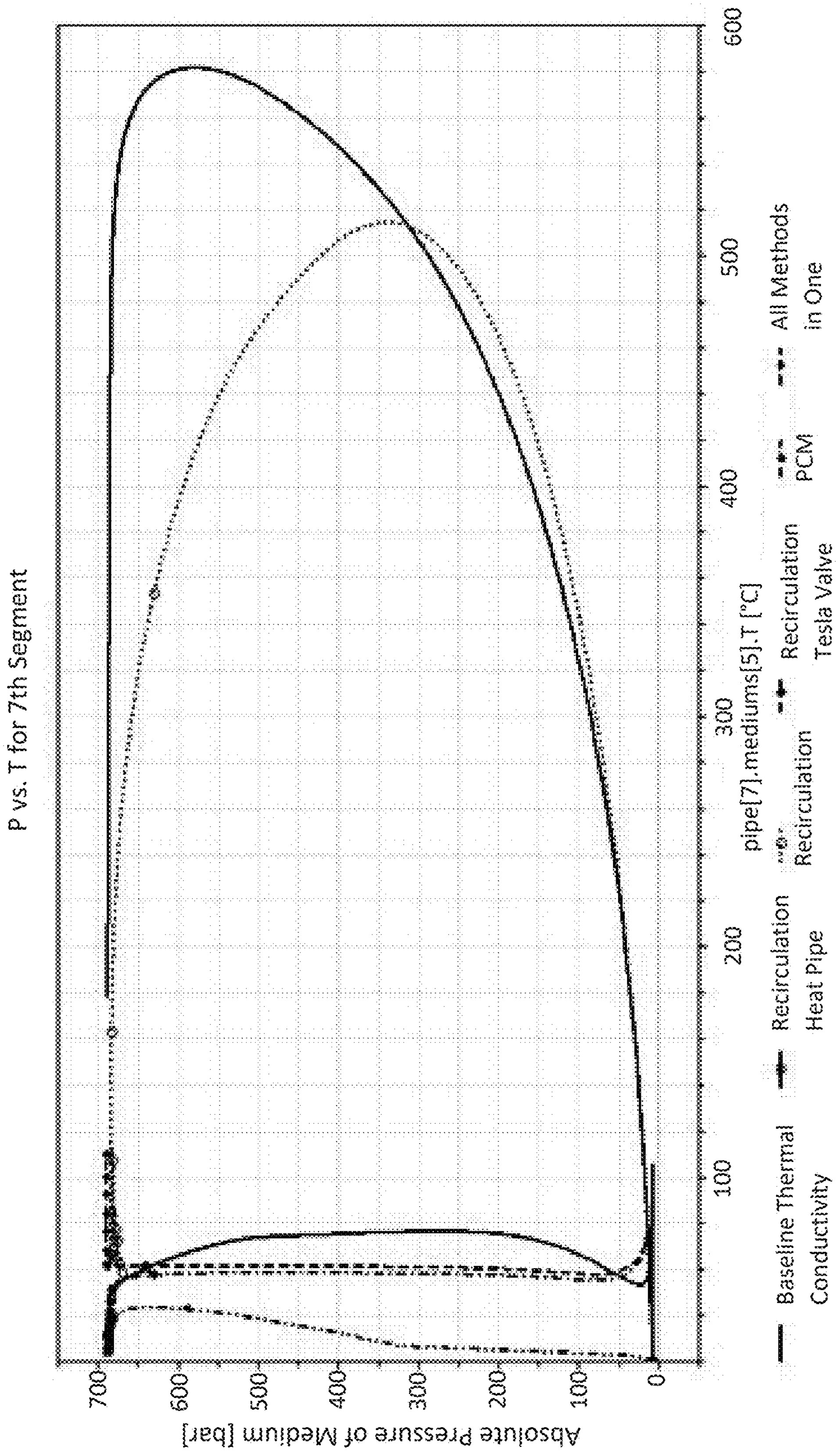
FIG. 10 is a graph of pressure vs. temperature curves for the last pressure vessel segment of the same conformable pressure vessels of FIG. 9.

FIG. 10 includes a graph of pressure vs. temperature curves for the last pressure vessel segment of the same conformable pressure vessels described with respect to FIG. 9. for the first 30 seconds of gas fill.

Table 1 shows the minimum temperature of the first pressure vessel segment and the maximum temperature of the last pressure vessel segment of each conformable pressure vessel described with respect to FIGS. 9 and 10.

TABLE 1

Test Results of Conformable Pressure Vessels Using Different Thermal Mitigation Methods

| Thermal Mitigation Technique | Minimum Temperature for First Segment (°C) | Maximum Temperature for Last Segment(°C) |
|---|---|---|
| Baseline Thermal Conductivity | 15.7 | 582.0 |
| Heat pipe | 15.7 | 106.3 |
| Simple Recirculation | 15.7 | 515.0 |
| Recirculation with Tesla valve | 16.1 | 76.6 |
| Phase Change Materials | 17.0 | 43.8 |
| All Techniques Together | 18.9 | 110.2 |

In the baseline pressure vessel including thermally conductive foam, the temperature of the first pressure vessel segment cooled from an initial temperature of 20 °C to a minimum temperature of 15.7 °C. The temperature of the last pressure vessel segment increased from 20 °C to a maximum temperature of 582 °C. These temperatures exceed the maximum capabilities of most materials used in typical gas storage tanks and would result in insufficient fill due to post-fill cooling.

In another tested configuration, a series of heat pipes were connected to the first and last pressure vessel segments. This modification significantly reduced the temperature gradient between the first and last pressure vessel segments. As shown in FIG. 10, the maximum temperature of the last pressure vessel segment was reduced from the baseline of 582 °C to 106.3 °C.

The next method evaluated was a recirculation method, for example, the recirculation method shown in FIG. 4, where the last pressure vessel segment is connected to the first pressure vessel segment with a connecting tube. The pressure vessel segments form a continuous chain, and hot gas from the last pressure vessel segment mixes with cooler gas in the first pressure vessel segment. FIGS. 9 and 10 show the pressure vs. temperature curves for the recirculation method in the first and last pressure vessel segments relative to the baseline. While the maximum temperature of the last pressure vessel segment was reduced from 582 °C to 515 °C, the minimum temperature of the first pressure vessel segment of 15.7 °C was not significantly changed. The recirculation method does allow the gases from the first and last pressure vessel segments to mix and provides some temperature mitigation; however, the recirculation method does not prevent the inflowing gas from initially traveling in the unintended direction from the first pressure vessel segment, through the connecting tube, and to the last pressure vessel segment. This extends the time required to establish a circulating flow path within the conformable pressure vessel.

By including a Tesla valve in the connecting tube, the initial flow of gases in the unintended direction is reduced, and a recirculation flow can be more quickly established in the conformable pressure vessel. As shown in FIG. 10, after an initial increase in temperature of the last pressure vessel segment, recirculating flow moved hot gases from the last pressure vessel segment to mix with the incoming cool gas from the fill port. This resulted in a maximum temperature of the last pressure vessel segment of only 76.6 °C. Additionally, the minimum temperature of the first pressure vessel segment increased from 15.7 °C of the baseline to 16.1 °C. This further demonstrates that hot gases from the last pressure vessel segment mixed with the cool gases in the first pressure vessel segment.

In another tested configuration, a PCM was used to coat the liner of the baseline conformable pressure vessel. As shown in FIG. 10, the maximum temperature of the last pressure vessel segment was reduced to 43.8 °C. As shown in FIG. 9, the minimum temperature of the first pressure vessel segment was increased to 17 °C.

Finally, a final gas recirculating pressure vessel model including heat pipes, a Tesla valve, thermally conductive foam, and a PCM was tested. As shown in FIG. 9, the minimum temperature of the first pressure vessel segment increased to 18.9 °C. As shown in FIG. 10, the maximum temperature of the last pressure vessel segment was 110.2 °C.

The above studies illustrate the significant improvement in the fill-related temperature gradient achieved by employing the devices and methods disclosed herein. These devices and methods enable faster filling and extraction of gas from conformable pressure vessels while at the same time maintaining temperatures within the operating limits of the materials of the conformable pressure vessel.

In a first example of an embodiment, a conformable pressure vessel includes pressure vessel segments comprising a liner, wherein the liner of each of the pressure vessel segments defines a cavity configured to contain pressurized gas, the cavity of each the pressure vessel segments fluidly coupled together; an inlet in fluid communication with the cavity of a first of the pressure vessel segments and configured to receive gas from a gas source; an outlet in fluid communication with the cavity of a last of the pressure vessel segments and configured to output the gas from the pressure vessel segments; and a connecting tube in fluid communication with the inlet and the outlet, wherein an interior profile of the connecting tube has a shape to enable flow of the gas through the connecting tube from the outlet to the inlet and prevent flow of the gas through the connecting tube from the inlet to the outlet.

In the first example, the conformable pressure vessel may include a nozzle comprising a first end downstream from the gas source, a second end downstream from the first end, and a middle portion positioned between the first end and the second end, wherein a cross-sectional area of the middle portion may be smaller than cross-sectional areas of the first end and the second end, and wherein the connecting tube may be fluidly connected to the nozzle downstream from the middle portion.

In the first example, the middle portion of the nozzle may be configured to create a low-pressure area as the gas moves past the middle portion.

In the first example, the low-pressure area may be configured to motivate flow of the gas from the last of the pressure vessel segments to the first of the pressure vessel segments.

In the first example, the interior profile of the connecting tube may include a Tesla valve that may be configured to enable the flow of the gas through the connecting tube from the outlet to the inlet and to prevent flow of the gas through the connecting tube from the inlet to the outlet.

In the first example, each of the pressure vessel segments may include a narrow portion, and wherein each of the pressure vessel segments may be coupled to each other at the narrow portion of each of the pressure vessel segments.

In the first example, the conformable pressure vessel may include a thermally conductive material that surrounds at least a portion of some of the pressure vessel segments.

In the first example, the conformable pressure vessel may include heat pipes that extend between at least some of the pressure vessel segments, wherein the heat pipes extend perpendicular to the pressure vessel segments and may be configured to allow heat to flow between the at least some of the pressure vessel segments.

In a second example of an embodiment, a conformable pressure vessel configured to contain pressurized gas includes a first pressure vessel segment comprising a first liner that defines a first cavity; a second pressure vessel segment comprising a second liner that defines a second cavity, wherein each of the first pressure vessel segment and the second pressure vessel segment includes a first section and a second section, wherein a diameter of the second section is smaller than a diameter of the first section, and wherein the first cavity is fluidly coupled to the second cavity through the second section of the first pressure vessel segment and the second section of the second pressure vessel segment; an inlet upstream of the second section of the first pressure vessel segment and configured to receive a gas from a source to supply the gas to the first cavity and the second cavity; and an outlet downstream of the second section of the second pressure vessel segment and configured to output the gas from the first cavity and the second cavity, wherein the inlet is in fluid communication with the outlet through a connecting tube that is shaped to enable unidirectional flow of the gas from the outlet to the inlet.

In the second example, the conformable pressure vessel may include a nozzle positioned between the source and the inlet, the nozzle comprising a narrow portion that may be configured to generate a pressure differential between the inlet and the outlet when the gas flows through the nozzle.

In the second example, the connecting tube and the pressure differential may be configured to direct the unidirectional flow of the gas from the outlet to the inlet when the gas flows through the nozzle.

In the second example, the connecting tube may include a Tesla valve that may be configured to enable unidirectional flow of the gas from the outlet to the inlet.

In the second example, the conformable pressure vessel includes a thermally conductive material that may enclose at least one of the first liner of the first pressure vessel segment or the second liner of the second pressure vessel segment.

In a third example of an embodiment, a conformable pressure vessel includes pressure vessel segments each comprising a liner, the liner of each of the pressure vessel segments coupled together to define a cavity, the cavity configured to contain pressurized gas therein; an inlet in fluid communication with the cavity and configured to receive gas from a source; an outlet in fluid communication with the cavity and configured to output the gas from the cavity; a thermally conductive material that surrounds at least one of the pressure vessel segments; and a shell that encloses the pressure vessel segments and the thermally conductive material, wherein at least one of the inlet or the outlet extends through the shell.

In the third example, the thermally conductive material may surround each of the pressure vessel segments.

In the third example the thermally conductive material may include thermally conductive foam.

In the third example, the thermally conductive foam and the shell may be configured to support the pressure vessel segments.

In the third example, the conformable pressure vessel may include a connecting tube in fluid communication with the inlet and the outlet, the connecting tube comprising an interior profile that may be configured to prevent flow of the gas from the inlet to the outlet and to allow flow of the gas from the outlet to the inlet, wherein the connecting tube may be configured to recirculate the gas through the pressure vessel segments in response to the inlet receiving the gas from the source, and wherein recirculation of the gas and the thermally conductive material may be configured to reach a thermal equilibrium between the pressure vessel segments.

In the third example, the conformable pressure vessel may include a reinforcement layer that surrounds the liner of each of the pressure vessel segments, wherein the thermally conductive material surrounds the reinforcement layer of the at least one of the pressure vessel segments.

In the third example, at least one of the inlet or the outlet may include a cap that connects the liner to the reinforcement layer of an initial of the pressure vessel segments or a last of the pressure vessel segments.

What is claimed is:

1. A conformable pressure vessel, comprising:

pressure vessel segments comprising a liner, wherein the liner of each of the pressure vessel segments defines a cavity configured to contain pressurized gas, the cavity of each the pressure vessel segments fluidly coupled together;

an inlet in fluid communication with the cavity of a first of the pressure vessel segments and configured to receive gas from a gas source;

an outlet in fluid communication with the cavity of a last of the pressure vessel segments and configured to output the gas from the pressure vessel segments; and a connecting tube in fluid communication with the inlet and the outlet, wherein an interior profile of the connecting tube has a shape to enable flow of the gas through the connecting tube from the outlet to the inlet and prevent flow of the gas through the connecting tube from the inlet to the outlet.

2. The conformable pressure vessel of claim 1, further comprising:

a nozzle comprising a first end downstream from the gas source, a second end downstream from the first end, and a middle portion positioned between the first end and the second end, wherein a cross-sectional area of the middle portion is smaller than cross-sectional areas of the first end and the second end, and wherein the connecting tube is fluidly connected to the nozzle downstream from the middle portion.

3. The conformable pressure vessel of claim 2, wherein the middle portion of the nozzle is configured to create a low-pressure area as the gas moves past the middle portion.

4. The conformable pressure vessel of claim 3, wherein the low-pressure area is configured to motivate flow of the gas from the last of the pressure vessel segments to the first of the pressure vessel segments.

5. The conformable pressure vessel of claim 1, wherein the interior profile of the connecting tube comprises a Tesla valve configured to enable the flow of the gas through the connecting tube from the outlet to the inlet and to prevent flow of the gas through the connecting tube from the inlet to the outlet.

6. The conformable pressure vessel of claim 1, wherein each of the pressure vessel segments includes a narrow portion, and wherein each of the pressure vessel segments is coupled to each other at the narrow portion of each of the pressure vessel segments.

7. The conformable pressure vessel of claim 1, further comprising a thermally conductive material that surrounds at least a portion of some of the pressure vessel segments.

8. The conformable pressure vessel of claim 1, further comprising:

heat pipes that extend between at least some of the pressure vessel segments, wherein the heat pipes extend perpendicular to the pressure vessel segments and are configured to allow heat to flow between the at least some of the pressure vessel segments.

9. A conformable pressure vessel configured to contain pressurized gas, the conformable pressure vessel comprising:

a first pressure vessel segment comprising a first liner that defines a first cavity;

a second pressure vessel segment comprising a second liner that defines a second cavity, wherein each of the first pressure vessel segment and the second pressure vessel segment includes a first section and a second section, wherein a diameter of the second section is smaller than a diameter of the first section, and wherein the first cavity is fluidly coupled to the second cavity through the second section of the first pressure vessel segment and the second section of the second pressure vessel segment;

an inlet upstream of the second section of the first pressure vessel segment and configured to receive a gas from a source to supply the gas to the first cavity and the second cavity; and an outlet downstream of the second section of the second pressure vessel segment and configured to output the gas from the first cavity and the second cavity, wherein the inlet is in fluid communication with the outlet through a connecting tube that is shaped to enable unidirectional flow of the gas from the outlet to the inlet.

10. The conformable pressure vessel of claim 9, further comprising:

a nozzle positioned between the source and the inlet, the nozzle comprising a narrow portion configured to generate a pressure differential between the inlet and the outlet when the gas flows through the nozzle.

11. The conformable pressure vessel of claim 10, wherein the connecting tube and the pressure differential are configured to direct the unidirectional flow of the gas from the outlet to the inlet when the gas flows through the nozzle.

12. The conformable pressure vessel of claim 9, wherein the connecting tube comprises a Tesla valve configured to enable unidirectional flow of the gas from the outlet to the inlet.

13. The conformable pressure vessel of claim 9, further comprising:

a thermally conductive material that encloses at least one of the first liner of the first pressure vessel segment or the second liner of the second pressure vessel segment.

14. A conformable pressure vessel, comprising:

pressure vessel segments each comprising a liner, the liner of each of the pressure vessel segments coupled together to define a cavity, the cavity configured to contain pressurized gas therein;

an inlet in fluid communication with the cavity and configured to receive gas from a source;

an outlet in fluid communication with the cavity and configured to output the gas from the cavity;

a thermally conductive material that surrounds at least one of the pressure vessel segments; and a shell that encloses the pressure vessel segments and the thermally conductive material, wherein at least one of the inlet or the outlet extends through the shell.

15. The conformable pressure vessel of claim 14, wherein the thermally conductive material surrounds each of the pressure vessel segments.

16. The conformable pressure vessel of claim 15, wherein the thermally conductive material comprises thermally conductive foam.

17. The conformable pressure vessel of claim 16, wherein the thermally conductive foam and the shell are configured to support the pressure vessel segments.

18. The conformable pressure vessel of claim 14, further comprising:

a connecting tube in fluid communication with the inlet and the outlet, the connecting tube comprising an interior profile configured to prevent flow of the gas from the inlet to the outlet and to allow flow of the gas from the outlet to the inlet, wherein the connecting tube is configured to recirculate the gas through the pressure vessel segments in response to the inlet receiving the gas from the source, and wherein recirculation of the gas and the thermally conductive material are configured to reach a thermal equilibrium between the pressure vessel segments.

19. The conformable pressure vessel of claim 14, further comprising:

a reinforcement layer that surrounds the liner of each of the pressure vessel segments, wherein the thermally conductive material surrounds the reinforcement layer of the at least one of the pressure vessel segments.

20. The conformable pressure vessel of claim 19, wherein at least one of the inlet or the outlet comprises a cap that connects the liner to the reinforcement layer of an initial of the pressure vessel segments or a last of the pressure vessel segments.

* * * * *